US010275008B2

United States Patent
Jones et al.

(10) Patent No.: US 10,275,008 B2
(45) Date of Patent: Apr. 30, 2019

(54) METHODS AND APPARATUS TO REDUCE COMPUTING DEVICE POWER CONSUMPTION

(71) Applicant: Intel Corporation, Santa Clara, CA (US)

(72) Inventors: Derrick A. Jones, Portland, OR (US); Jithendra S. Kancherlapalli, Hillsboro, OR (US); Michael C. Walz, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 205 days.

(21) Appl. No.: 15/272,629

(22) Filed: Sep. 22, 2016

(65) Prior Publication Data

US 2018/0081420 A1 Mar. 22, 2018

(51) Int. Cl.
| G06F 1/32 | (2006.01) |
| G06F 9/48 | (2006.01) |
| G06F 1/3206 | (2019.01) |
| G06F 1/3228 | (2019.01) |
| G06F 1/3234 | (2019.01) |

(52) U.S. Cl.
CPC .......... *G06F 1/3206* (2013.01); *G06F 1/3228* (2013.01); *G06F 1/3243* (2013.01); *Y02D 10/152* (2018.01)

(58) Field of Classification Search
None
See application file for complete search history.

(56) References Cited

U.S. PATENT DOCUMENTS

| 7,146,439 B1 * | 12/2006 | Ofer ...................... G06F 3/0611 710/45 |
| 2006/0184287 A1 * | 8/2006 | Belady ................. G06F 1/3203 700/291 |
| 2006/0227605 A1 * | 10/2006 | Choi ....................... G11C 5/04 365/185.08 |
| 2008/0028240 A1 * | 1/2008 | Arai ..................... G06F 1/3203 713/300 |
| 2011/0161627 A1 * | 6/2011 | Song .................... G06F 1/3203 712/30 |
| 2013/0290758 A1 * | 10/2013 | Quick .................. G06F 1/3203 713/323 |
| 2014/0006819 A1 * | 1/2014 | Min ....................... G06F 1/324 713/320 |
| 2015/0198991 A1 | 7/2015 | Bircher et al. |
| 2015/0199002 A1 | 7/2015 | Jahagirdhar et al. |
| 2015/0261290 A1 * | 9/2015 | Brown ................. G06F 1/3293 713/323 |

OTHER PUBLICATIONS

International Searching Authority, International Search Report and the Written Opinion, issued in connection with International Application No. PCT/US2017/045691, dated Nov. 15, 2017, 12 pages.

* cited by examiner

*Primary Examiner* — Hyun Nam
(74) *Attorney, Agent, or Firm* — Hanley, Flight and Zimmerman, LLC (57) ABSTRACT

Methods, apparatus, systems and articles of manufacture to reduce computing device power consumption are disclosed. Examples determine an idle period based on hardware residency of the computing device, and set a timer to wake up a central processing unit (CPU) from a low power idle state after the idle period, the CPU to exit the low power idle state in response to expiration of the idle period.

16 Claims, 6 Drawing Sheets

```
GET_CURRENT_SUGGESTED_IDLE_PERIOD():
    IF (HIGHER_DEVICE_POWER_STATE_CHANGE_REPORTED)
        IDLE_PERIOD_COEFFICIENT = 2 // RESET
    ELSE
        IDLE_PERIOD_COEFFICIENT *=2; // INCREASE

// NOTE, IF NO RESIDENCY ACHIEVED IN DEEP STATES IDLE_PERIOD_COEFFICIENT
    // HAS SMALLER IMPACT BECAUSE OF THE WEIGHTED RESIDENCY IN SHALLOWER
    // STATES. (WITH SMALLER TIME SCALES)
    IDLE_TIME_PERIOD = IDLE_PERIOD_COEFFICIENT * (RESIDENCY_0*SCALE_0 +
                       RESIDENCY_1*SCALE_1 + ... + RESIDENCY_N*SCALE_N)

IF (IDLE_TIME_PERIOD>MAX_TIME) IDLE_TIME_PERIOD = MAX_TIME
    IF (IDLE_TIME_PERIOD<MIN_TIME) IDLE_TIME_PERIOD = MIN_TIME // NO DELAY

RETURN IDLE_TIME_PERIOD
```

METHODS AND APPARATUS TO REDUCE COMPUTING DEVICE POWER CONSUMPTION

FIELD OF THE DISCLOSURE

This disclosure relates generally to power management, and, more particularly, to methods and apparatus to reduce computing device power consumption.

BACKGROUND

In recent years, low power idle states are limited to statically defined durations. The low power idle states are initiated/terminated based on a mapping of low power platform states to acceptable device power states for associated devices. The acceptable device power states are often programmed in the basic input output system (BIOS) of a computing device and, therefore, do not monitor hardware configuration changes that can occur during runtime of the computing device.

BRIEF DESCRIPTION OF THE DRAWINGS

Wherever possible, the same reference numbers will be used throughout the drawing(s) and accompanying written description to refer to the same or like parts.

DETAILED DESCRIPTION

Computing devices transition from power states due to numerous reasons. For example, a computing device may transition from a low power idle state to normal operation (e.g., wake) to execute one or more instructions, as a result of a software timer expiring, as a result of an interrupt, etc. In some examples, an operating system (OS) of the computing device may delay one or more software timers within a predefined tolerance (e.g., by a threshold amount) so that multiple software timers expire at the same time or substantially the same time, and may be addressed during a single computer processing unit (CPU) wake instead of waking the CPU each time a non-delayed software timer expires. Such delays cause a computing device to remain in a low power state for a longer period of time.

Computing devices often have multiple low power states with differing privileges. For example, a computing device with a Windows® operating system has power states S0, S1, S2, S3, and S4. Power state S0 corresponds to a fully operational working state. Hardware can implement platform idle states within power state S0 such as S0i1, s0i2, etc., which consume little power but provide short resume time. Power states S1-S3 correspond to sleep states. Power state S4 corresponds to a hibernation state. Often, computing devices enter the lowest possible power state when a platform idle state entry mechanism (e.g., CPU instruction "mwait") is executed.

Power state S1 corresponds to a first low power state in which the computing device and/or components thereof appear to be off. Power state S1 consumes less power than power state S0. Power state S2 corresponds to a second low power state in which the computing device and/or components thereof appear to be off. Power state S2 consumes less power than power state S0-S1. Power state S3 corresponds to a third low power state in which the computing device and/or components thereof appear to be off. Power state S3 consumes less power than power state S0-S2. In power states S1-S3, volatile memory is refreshed (e.g., sparingly provided power) to maintain the system state within the volatile memory.

Power state S4 corresponds to a fourth power state in which the computing device and/or components thereof appear to be off. As opposed to power states S1-S3 where volatile memory is refreshed (e.g., sparingly provided power) to maintain the system state within the volatile memory, the contents of volatile memory are saved in non-volatile memory (e.g., which does not require power) to maintain the system state in power state S4. Because the volatile memory need not be refreshed to maintain the system state, power state S4 consumes even less power than power states S0-S3.

Figure 1:
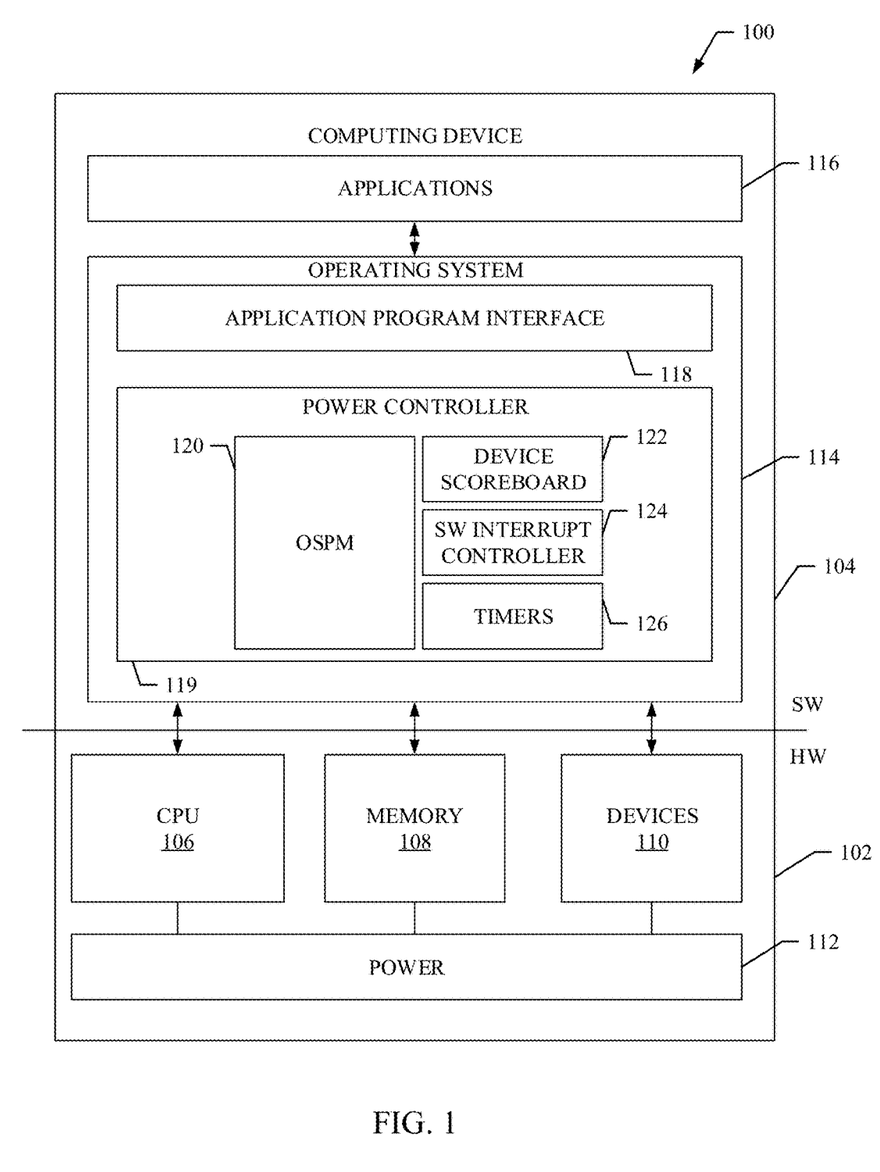
FIG. 1 is an illustration of an example computing device.

FIG. 1 illustrates an example computing device 100 including hardware 102 and software 104. In some examples, portions of the hardware 102 may be implemented using software, portions of the software 104 may be implemented using hardware, and/or any combination thereof. The example hardware 102 includes a central processing unit (CPU) 106, a memory 108, one or more hardware devices 110, and a power supply 112. The example CPU 106 is a microprocessor such as, for example, Intel® Core i3, i5, i7, Intel® Atom, or other processors/microprocessor that utilize x86 instruction sets. Other instruction sets may be used. The example memory 108 may be volatile or non-volatile memory. The example memory 108 stores instructions for execution by the example CPU 106. Example hardware devices 110 include input/output devices (e.g., mouse, keyboard, display, touchscreen, etc.), network devices (e.g., modems, network cards, etc.), or other computing device hardware (e.g., video cards, graphics cards, sound cards, etc.). In some examples, the power supply 112 is a battery (e.g., lithium-ion). Alternatively, the power supply 112 may be a power supply unit connected to a power grid (e.g., power is received via an outlet).

The example software 104 includes an example operating system 114 and one or more example applications 116. The example operating system 114 includes an example application program interface 118 and an example power controller 119. The example application program interface 118 connects the one or more example applications 116 to the example hardware 102. The example power controller 119 controls the power state (e.g., S0-S4) in which the computing device 100 operates.

The example power controller 119 of FIG. 1 includes an operating system power manager (OSPM) 120, a device scoreboard 122, an interrupt controller 124, and one or more timers 126. In some examples, the OSPM 120 monitors low power platform states of the hardware devices 110 associated with the computing device 100. In some examples, the device scoreboard 122 maps low power platform states with acceptable device power states for each of the hardware devices 110. The OSPM 120 determines whether the monitored low power platform states of the hardware devices 110 are in acceptable states based on the device scoreboard 122. In the illustrated example of FIG. 1, the interrupt controller 124 is a software interrupt controller 124. When all of the monitored low power platform states of all of the hardware devices 110 are in acceptable states, the OSPM 120 instructs the software interrupt controller 124 to set the one or more timers 126 to a predetermined value. The one or more timers 126 delay the CPU 106 from waking from low power states. However, if any of the hardware devices 110 no longer remain in an acceptable state and/or a power state change occurs (e.g., device state change, hardware residency decrease, user interaction, and/or other external interrupt), the CPU 106 wakes from a low power state. Additionally, if the one or more timers 126 delay the CPU 106 from waking from low power states for too long, the CPU 106 may be delayed from entering even lower power states (e.g., the CPU 106 may be delayed from waking up from power state S1 to execute an instruction to enter lower power state S2).

Figure 2:
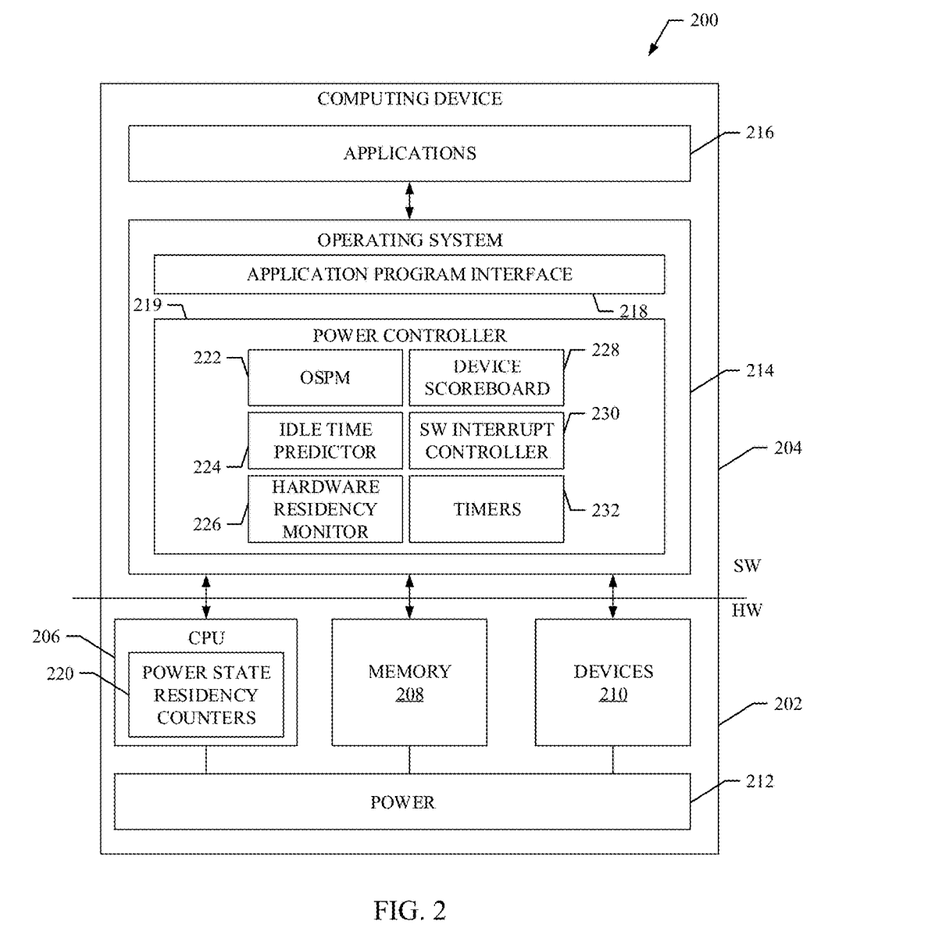
FIG. 2 is an illustration of an example computing device with an example power controller in accordance with the teachings of this disclosure.

As disclosed herein, the example methods and apparatus predict the optimal time for a computing device to remain in a particular power state. FIG. 2 illustrates an example computing device 200 in accordance with the teachings of this disclosure. The example computing device 200 includes hardware 202 and software 204. In some examples, portions of the hardware 202 may be implemented using software, portions of the software 204 may be implemented using hardware, and/or any combination thereof. The example hardware 202 includes a CPU 206, a memory 208, one or more hardware devices 210, and a power supply 212. The example CPU 206 is a microprocessor such as, for example, Intel® Core i3, i5, i7, Intel® Atom, or other processors/microprocessor that utilize x86 instruction sets. Other instruction sets may be used. The example memory 208 may be volatile or non-volatile memory. The example memory 208 stores instructions for execution by the example CPU 206. Example hardware devices 210 include input/output devices (e.g., mouse, keyboard, display, touchscreen, etc.), network devices (e.g., modems, network cards, etc.), or other computing device hardware (e.g., video cards, graphics cards, sound cards, etc.). In some examples, the power supply 212 is a battery (e.g., lithium-ion). Alternatively, the power supply 212 may be a power supply unit connected to a power grid (e.g., power is received via an outlet).

The example software 204 includes an operating system 214 and one or more applications 216. The example operating system 214 includes an example application program interface 218 and an example power controller 219. The example application program interface 218 connects the one or more example applications 216 to the example hardware 202. The example power controller 219 controls the power state (e.g., S0-S4) in which the computing device 200 operates. As disclosed herein, the power controller 219 utilizes power state residency counters 220 to determine the optimal idle time for the example computing device 200 to remain in respective low power states.

In the illustrated example of FIG. 2, the example power state residency counters 220 are hardware timers implemented by the CPU 206. For example, the power state residency counters 220 may be model specific registers (MSR). However, the example power state residency counters 220 may be implemented by other hardware 202 and/or firmware of the computing device 200. The example power state residency counters 220 count the time that the computing device 200 resides in respective power states. For example, a first one of the power state residency counters 220 may count the residency of the computing device 200 in power state S0i0 (e.g., residency_0), a second one of the power state residency counters 220 may count the residency of the computing device 200 in power state S0i1 (e.g., residency_1), etc. The power state residency counters 220 may utilize a system clock and count upwards from zero when the computing device 200 is in each respective power state. In some examples, respective ones of the power state residency counters 220 may be reset when the computing device 200 returns to a respective power states. In some examples, residency is determined based on of a difference between two points in time.

The example power controller 219 includes an example OSPM 222, an example idle time predictor 224, an example hardware residency monitor 226, an example device scoreboard 228, an example interrupt controller 230, and one or more example timers 232. In some examples, the OSPM 222 monitors low power platform states of the hardware devices 210 associated with the computing device 200. In the illustrated example of FIG. 2, the interrupt controller 230 is a software interrupt controller 230.

The example idle time predictor 224 determines a time for which the CPU 206 is to remain in a low power state. The example idle time predictor 224 increases the amount of time the CPU 206 resides in one or more low power states, thereby reducing power consumption of the computing device 200. The example idle time predictor 224 generates an idle period coefficient (IPC). In some examples, the idle period coefficient is static (e.g., a constant such as, for example, two). In some examples, the idle period coefficient increases the longer that the CPU 206 resides in a low power state. In such examples, the idle period coefficient increases over time under the assumption that the longer a computing device is in a low power state, the more likely that the computing device will remain in the low power state.

The example idle time predictor 224 receives residency times ($R_i$) from the example hardware residency monitor 226 corresponding to the times that the CPU 206 remained in each low power state. For example, for N low power states, the idle time predictor 224 receives variables residency_0, residency_1, . . . , residency_N. In some examples, the idle time predictor 224 determines scale factors ($S_i$) corresponding to each low power state. For example, for N low power states, the idle time predictor 224 determines variables scale_0, scale_1, . . . , scale_N associated with variables residency_0, residency_1, . . . , residency_N. In some examples, the scale factors ($S_i$) weigh the various residency variables according to the depth of the respective power state. For example, a lower power state (e.g., S3) may be weighed more heavily than a higher power state (e.g., S2). In some examples, the scale factors ($S_i$) are heuristics. In some examples, the scale factors ($S_i$) are based on statistics of previously known power state residencies (e.g., historical analysis of the hardware 202 of the computing device 200). In some examples, the scale factors ($S_i$) normalize the variables residency_0, residency_1, . . . , residency_N.

The idle time predictor 224 determines an idle time period (ITP) for which to delay a software timer based on the idle period coefficient, the residency factors, and the scale factors. In some examples, the idle time predictor 224 utilizes Equation 1 to determine the predicted time:

$$ITP = IPC * \sum_{i=0}^{n} R_i * S_i \quad \text{Equation 1}$$

The example IPC may be any value greater than one, such that Equation 1 reflects an exponential growth curve. As disclosed herein, the ITP grows exponentially over time following the assumption that an idle computing device will continue to remain idle.

In some examples, the idle time predictor 224 sets minimum and maximum delays. For example, the idle time predictor 224 sets a maximum delay such that if the determined idle time period exceeds the maximum delay, the idle time predictor 224 selects the maximum delay as the idle time period. In some examples, the idle time predictor 224 sets a minimum delay such that if the determined idle time period does not meet or exceed the minimum delay, the idle time predictor 224 selects the minimum delay as the idle time period.

The example hardware residency monitor 226 monitors the power state residency counters 220 of the CPU 206. The example hardware residency monitor 226 determines residency times ($R_i$) of respective power states based on the power state residency counters 220 (e.g., by reading the power state residency counters 220 and converting their output to the time domain). In some examples, the hardware residency monitor 226 identifies changes from lower power device states (e.g., D3) to higher power states (e.g., D0) and/or decreased residency times for a particular power state as a need for a higher power state. In such examples, the hardware residency monitor 226 communicates such state changes to the idle time predictor 224.

In some examples, the device scoreboard 228 maps low power platform states with acceptable device power states for each of the hardware devices 210. The software interrupt controller 230 sets the one or more timers 232 to delay execution of an interrupt, thereby controlling the sleep/wake cycle of the CPU 206. The one or more timers 232 delay the CPU 206 from executing an interrupt that would otherwise wake the CPU 206 from low power states.

In some examples, the OSPM 222 determines whether the monitored low power platform states of the hardware devices 210 are in acceptable states based on the device scoreboard 228. When all of the monitored low power platform states of all of the hardware devices 210 are in acceptable states, the OSPM 222 instructs the software interrupt controller 230 to set the one or more timers 232 to the idle time period (ITP) determined by the idle time predictor 224. The one or more timers 232 delay the CPU 206 from waking from low power states until the idle time period expires. However, if any of the hardware devices 210 are no longer in acceptable states and/or a power state change occurs (e.g., device state change, hardware residency decrease, user interaction, and/or other external interrupt), the CPU 206 wakes from the low power state.

While an example manner of implementing the power controller 219 is illustrated in FIG. 2, one or more of the elements, processes and/or devices illustrated in FIG. 2 may be combined, divided, re-arranged, omitted, eliminated and/or implemented in any other way. Further, the example OSPM 222, the example idle time predictor 224, the example hardware residency monitor 226, the example device scoreboard 228, the example software interrupt controller 230, the example one or more timers 232, and/or, more generally, the power controller 219 of FIG. 2 may be implemented by hardware, software, firmware and/or any combination of hardware, software and/or firmware. Thus, for example, any of the example OSPM 222, the example idle time predictor 224, the example hardware residency monitor 226, the example device scoreboard 228, the example software interrupt controller 230, the example one or more timers 232, and/or, more generally, the power controller 219 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example OSPM 222, the example idle time predictor 224, the example hardware residency monitor 226, the example device scoreboard 228, the example software interrupt controller 230, and/or the example timers 232 is/are hereby expressly defined to include a tangible computer readable storage device or storage disk such as a memory, a digital versatile disk (DVD), a compact disk (CD), a Blu-ray disk, etc. storing the software and/or firmware. Further still, the example power controller 219 of FIG. 2 may include one or more elements, processes and/or devices in addition to, or instead of, those illustrated in FIG. 2, and/or may include more than one of any or all of the illustrated elements, processes and devices.

Figure 3:
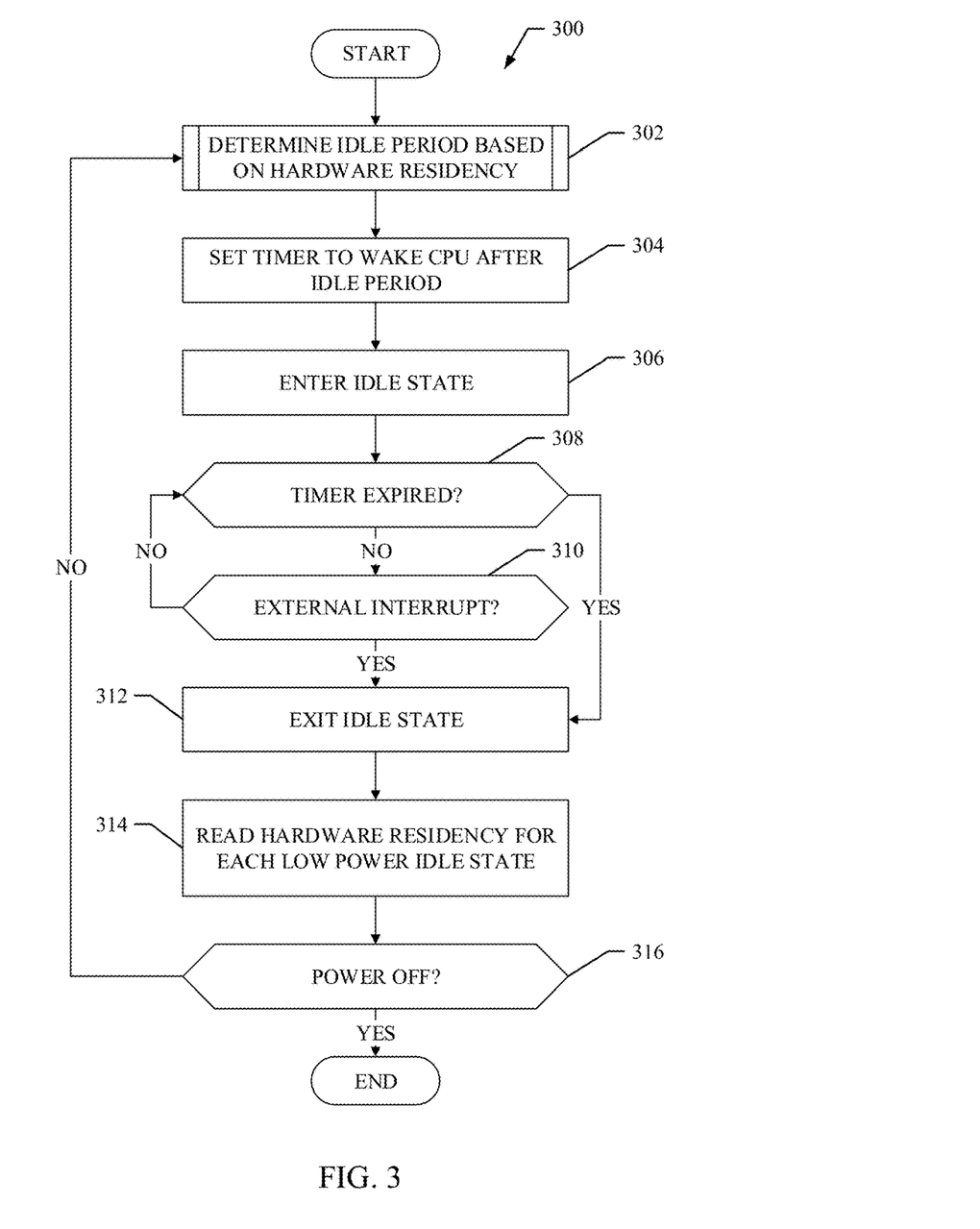
FIG. 3 is a flowchart representative of computer-readable instructions that may be executed to implement the example power controller of FIG. 2.
Figure 5:
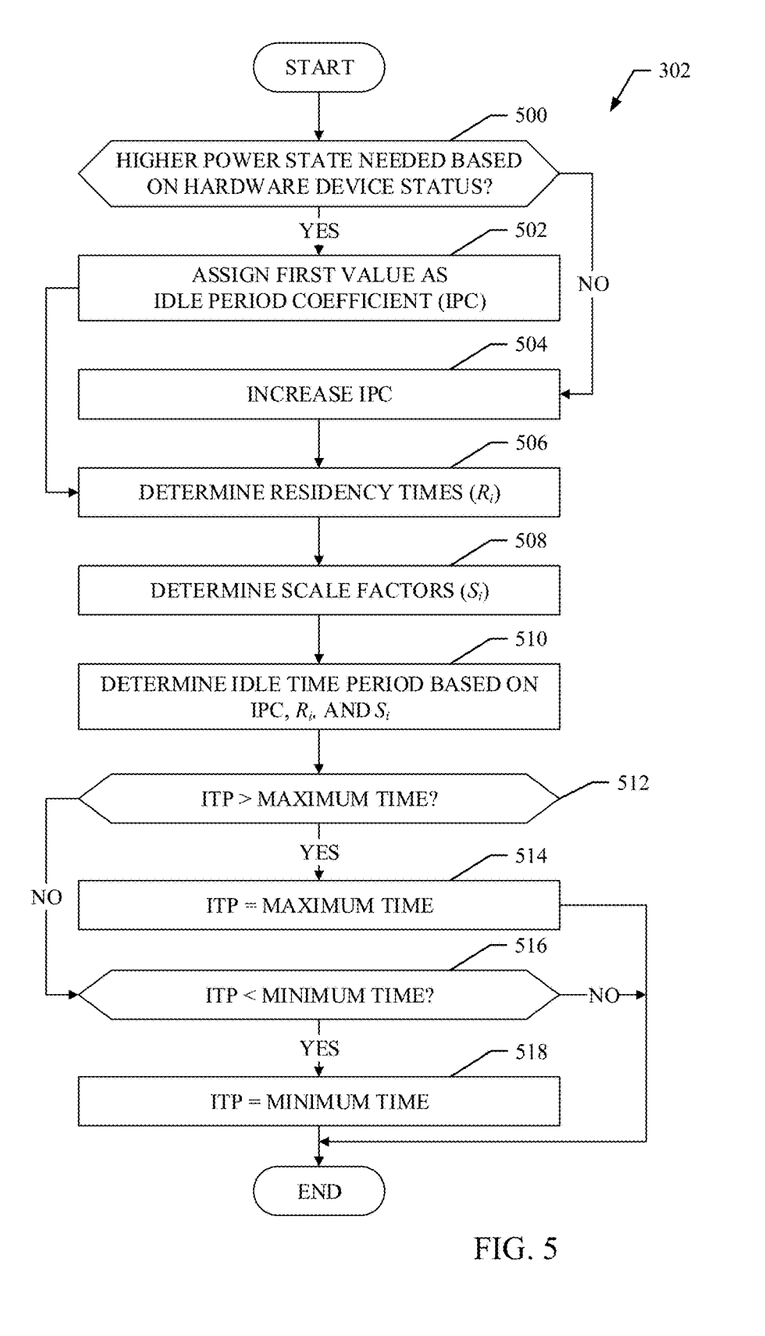
FIG. 5 is a flowchart representative of computer-readable instructions that may be executed to implement the example idle time predictor of FIG. 2.

Flowcharts representative of example machine readable instructions for implementing the power controller 219 of FIG. 2 are shown in FIGS. 3 and 5. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example programs are described with reference to the flowcharts illustrated in FIGS. 3 and 5, many other methods of implementing the example power controller 219 may alternatively be used. For example, the order of execution of the blocks may be changed, and/or some of the blocks described may be changed, eliminated, or combined.

As mentioned above, the example processes of FIGS. 3 and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 3 and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 3 is a flowchart representative of computer-readable instructions embodied in a program 300 to implement the power controller 219 of FIG. 2. The program 300 of FIG. 3 begins at block 302. At block 302, the example idle time predictor 224 determines an idle time period based on hardware residency. At block 304, the example idle time predictor 224 instructs the example software interrupt controller 230 to set the one or more timers 232 to wake the CPU 206 after the idle time period. At block 306, the CPU 206 enters a low power idle state. In some examples, the CPU 206 enters the lowest possible power state (e.g., out of S1-S4). At block 308, the example software interrupt controller 230 determines whether the one or more timers 232 have expired. If the one or more timers 232 have not expired (block 308: NO), control proceeds to block 310. At block 310, the example software interrupt controller 230 determines whether there is an external interrupt (e.g., device power state change, user interaction, etc.). If the example software interrupt controller 230 determines there is no external interrupt (block 310: NO), control returns to block 308.

If the one or more timers 232 have expired (block 308: YES) or if the example software interrupt controller 230 determines there is an external interrupt (block 310: YES), control proceeds to block 312. At block 312, the example CPU 206 wakes up or otherwise exits the low power state (e.g., to power state S0). At block 314, the example hardware residency monitor 226 reads the example power state residency counters 220 to determine the residency times for each low power idle state. If the computing device 200 is powered off (block 316: YES), the example program 300 ceases operation. Otherwise (block 316: NO), control returns to block 302 with the most recently read residency times.

Figure 4:
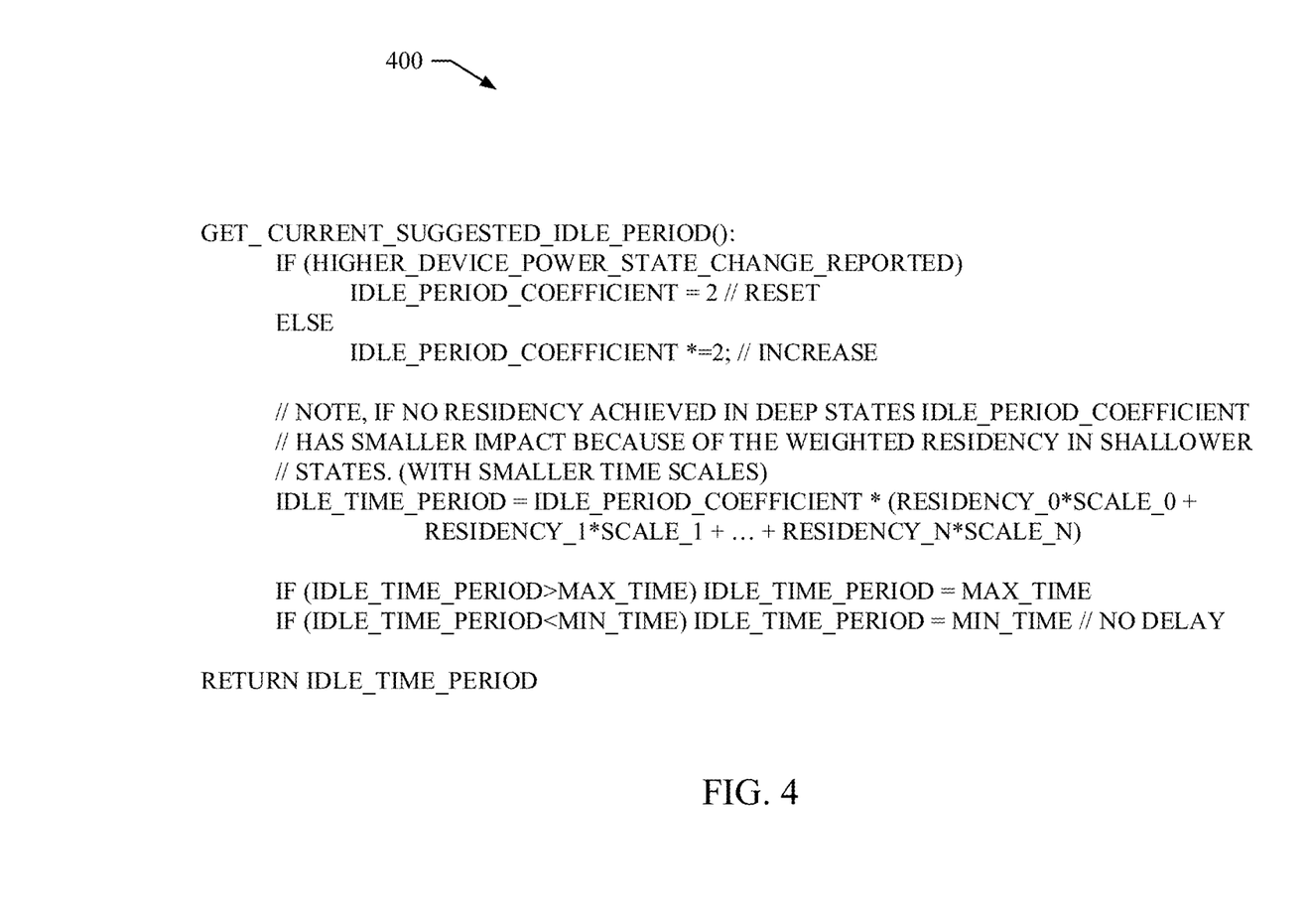
FIG. 4 is an example implementation of computer-readable instructions that may be executed to implement the example idle time predictor of FIG. 2.

FIG. 4 is an example illustration of instructions 400 to implement the idle time predictor 224. FIG. 5 is a flowchart representative of the example instructions 400 of FIG. 4 to implement block 302 of FIG. 3. The example implementation of block 302 begins at block 500. At block 500, the example idle time predictor 224 determines whether a higher power state is needed. For example, the idle time predictor 224 determines a higher power state is needed when the CPU 206 is to wake from a lower power state (e.g., in response to an interrupt, device state change, user interaction, etc.). In some examples, the hardware residency monitor 226 identifies changes from lower power states (e.g., S2) to higher power states (e.g., S1) and/or decreased residency times for a particular power state as a need for a higher power state. If a higher power state is needed (block 500: YES), control proceeds to block 502. Otherwise (block 500: NO), control proceeds to block 504.

At block 502, the example idle time predictor 224 assigns a first value as an idle period coefficient (IPC). In some examples, the first value is a constant such as, for example, two. At block 504, the idle time predictor 224 increases the IPC. In some examples, the idle time predictor doubles the IPC. The increasing of the IPC increases the next idle time period following the assumption that the computing device 200 will remain in an idle state upon further iterations of the example implementation of block 302. After block 502 or 504, control proceeds to block 506. At block 506, the idle time predictor 224 receives residency times ($R_i$) from the example hardware residency monitor 226. At block 508, the idle time predictor 224 determines scale factors ($S_i$) for respective residency times ($R_i$). The idle time predictor 224 determines the idle time period based on the idle period coefficient, the scale factors ($S_i$), and the residency times ($R_i$) (block 510). In some examples, the idle time predictor 224 utilizes Equation 1 to determine the idle time period using the idle period coefficient, the scale factors ($S_i$), and the residency times ($R_i$).

In some examples, the idle time predictor 224 determines whether the idle time period determined at block 510 was greater than a maximum delay time (block 512). If the idle time period determined at block 510 was greater than the maximum delay time (block 512: YES), control proceeds to block 514. At block 514, the idle time period selects the maximum delay time as the idle time period. Thereafter, the example implementation of block 302 ceases operation.

If the idle time period determined at block 510 was not greater than a maximum delay time (block 512: NO), control proceeds to block 516. At block 516, the idle time predictor 224 determines whether the idle time period determined at block 510 was less than a minimum delay time (block 516). If the idle time period determined at block 510 was less than a minimum delay time (block 516: YES), control proceeds to block 520. At block 520, the idle time period selects the minimum delay time as the idle time period. Thereafter, or if the idle time period determined at block 510 was not less than the minimum delay time (block 516: NO), the example implementation of block 302 ceases operation.

Figure 6:
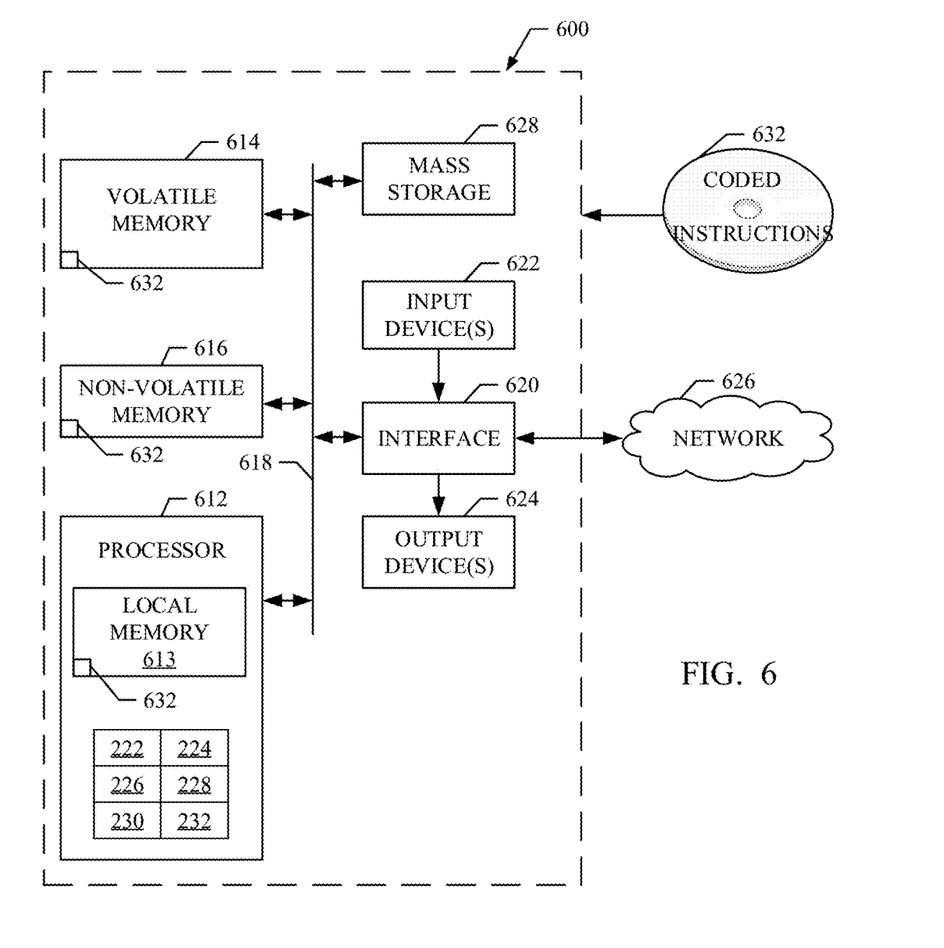
FIG. 6 is an example processor platform capable of executing the computer-readable instructions of FIG. 3 to implement the example power controller of FIG. 2 and executing the computer-readable instructions of FIG. 5 to implement the example idle time predictor of FIG. 2.

FIG. 6 is a block diagram of an example processor platform 600 capable of executing the instructions of FIG. 3 to implement the example power controller of FIG. 2 and executing the computer-readable instructions of FIG. 5 to implement the example idle time predictor of FIG. 2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3 and 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture extend software delay timers based on hardware residency to determine optimal times for a computing device to remain in low power states. Based on the optimal times that the computing device remains in the low power states, overall power consumption of the computing device is reduced. Reduced power consumption may result in improved battery life, energy savings, smaller power supply designs, and/or lower power cooling requirements.

Example methods, apparatus, systems and articles of manufacture to reduce power consumption of a computing device are disclosed herein. Further examples and combinations thereof include the following.

Example 1 is an apparatus to reduce power consumption of a computing device, the apparatus includes an idle time predictor to determine an idle period based on hardware residency of the computing device, and an software interrupt controller to set a timer to wake up a central processing unit (CPU) from a low power idle state after the idle period, the CPU to exit the low power idle state in response to expiration of the idle period.

Example 2 includes the apparatus as defined in example 1, further including a hardware residency monitor to monitor power state residency counters for times in which the CPU resides in respective low power idle states.

Example 3 includes the apparatus as defined in example 2, wherein the hardware residency monitor is to monitor power state residency counters in response to the CPU exiting the respective low power idle states.

Example 4 includes the apparatus as defined in example 2 or example 3, wherein to determine the idle period based on the hardware residency, the idle time predictor is to determine an idle period coefficient, determine scale factors for respective lower power idle states, and determine the idle period by multiplying the idle period coefficient by a sum of the times in which the CPU resides in the respective low power idle states multiplied by respective scale factors.

Example 5 includes the apparatus as defined in example 2, wherein to determine the idle period based on the hardware residency, the idle time predictor is to determine an idle period coefficient, determine scale factors for respective lower power idle states, and determine the idle period by multiplying the idle period coefficient by a sum of the times in which the CPU resides in the respective low power idle states multiplied by respective scale factors.

Example 6 includes the apparatus as defined in example 5, wherein to determine the idle period coefficient, the idle time predictor is to, initialize, when a power state increase of a device occurs, the idle period coefficient to a first value, double the idle period coefficient.

Example 7 includes the apparatus as defined in example 5, wherein to determine the idle period coefficient, the idle time predictor is to, initialize, when a power state increase of a device occurs, the idle period coefficient to a first value, double the idle period coefficient.

Example 8 includes the apparatus as defined in example 5, wherein to determine the idle period based on the hardware residency, the idle time predictor is to, in response to determining that the idle period is greater than a first threshold, assign the first threshold as the idle period, and in response to determining that the idle period is less than a second threshold, assign the second threshold as the idle period.

Example 9 includes the apparatus as defined in example 4, wherein to determine the idle period based on the hardware residency, the idle time predictor is to, in response to determining that the idle period is greater than a first threshold, assign the first threshold as the idle period, and in response to determining that the idle period is less than a second threshold, assign the second threshold as the idle period.

Example 10 includes the apparatus as defined in example 1 or example 2, wherein idle time of the computing device is increased and power consumption of the computing device is decreased in response to the idle time predictor determining the idle period based on hardware residency of the computing device.

Example 11 includes the apparatus as defined in example 1, wherein idle time of the computing device is increased and power consumption of the computing device is decreased in response to the idle time predictor determining the idle period based on hardware residency of the computing device.

Example 12 is a method to reduce power consumption of a computing device includes determining an idle period based on hardware residency of the computing device, and setting a timer to wake up a central processing unit (CPU) from a low power idle state after the idle period, the CPU to exit the low power idle state in response to expiration of the idle period.

Example 13 includes the method as defined in example 12, further including monitoring power state residency counters for times in which the CPU resides in respective low power idle states.

Example 14 includes the method as defined in example 13, wherein the monitoring of the power state residency counters occurs in response to the CPU exiting the respective low power idle states.

Example 15 includes the method as defined in example 13 or example 14, wherein the determining of the idle period based on the hardware residency includes, determining an idle period coefficient, determining scale factors for respective lower power idle states, and determining the idle period by multiplying the idle period coefficient by a sum of the times in which the CPU resides in the respective low power idle states multiplied by respective scale factors.

Example 16 includes the method as defined in example 13, wherein the determining of the idle period based on the hardware residency includes, determining an idle period coefficient, determining scale factors for respective lower power idle states, and determining the idle period by multiplying the idle period coefficient by a sum of the times in which the CPU resides in the respective low power idle states multiplied by respective scale factors.

Example 17 includes the method as defined in example 15, wherein the determining of the idle period coefficient includes initializing, when a power state increase of a device occurs, the idle period coefficient to a first value, and doubling the idle period coefficient.

Example 18 includes the method as defined in example 16, wherein the determining of the idle period coefficient includes initializing, when a power state increase of a device occurs, the idle period coefficient to a first value, and doubling the idle period coefficient.

Example 19 includes the method as defined in example 15, wherein the determining of the idle period based on the hardware residency includes in response to determining that the idle period is greater than a first threshold, assigning the first threshold as the idle period, and in response to determining that the idle period is less than a second threshold, assigning the second threshold as the idle period.

Example 20 includes the method as defined in example 16, wherein the determining of the idle period based on the hardware residency includes in response to determining that the idle period is greater than a first threshold, assigning the first threshold as the idle period, and in response to determining that the idle period is less than a second threshold, assigning the second threshold as the idle period.

Example 21 includes the method as defined in example 12, wherein the determining of the idle period based on hardware residency of the computing device increases idle time of the computing device and decreases power consumption of the computing device.

Example 22 is a tangible computer-readable storage medium includes instructions that, when executed, cause a machine to at least determine an idle period based on hardware residency of the computing device, and set a timer to wake up a central processing unit (CPU) from a low power idle state after the idle period, the CPU to exit the low power idle state in response to expiration of the idle period.

Example 23 includes the computer-readable medium as defined in example 22, wherein the instructions, when executed, further cause the machine to monitor power state residency counters for times in which the CPU resides in respective low power idle states.

Example 24 includes the computer-readable medium as defined in example 23, wherein the instructions, when executed, further cause the machine to monitor the power state residency counters in response to the CPU exiting the respective low power idle states.

Example 25 includes the computer-readable medium as defined in example 23 or example 24, wherein the instructions, when executed, further cause the machine to determine an idle period coefficient, determine scale factors for respective lower power idle states, and determine the idle period by multiplying the idle period coefficient by a sum of the times in which the CPU resides in the respective low power idle states multiplied by respective scale factors.

Example 26 includes the computer-readable medium as defined in example 23, wherein the instructions, when executed, further cause the machine to determine an idle period coefficient, determine scale factors for respective lower power idle states, and determine the idle period by multiplying the idle period coefficient by a sum of the times in which the CPU resides in the respective low power idle states multiplied by respective scale factors.

Example 27 includes the computer-readable medium as defined in example 25, wherein the instructions, when executed, further cause the machine to initialize, when a power state increase of a device occurs, the idle period coefficient to a first value, and double the idle period coefficient.

Example 28 includes the computer-readable medium as defined in example 26, wherein the instructions, when executed, further cause the machine to initialize, when a power state increase of a device occurs, the idle period coefficient to a first value, and double the idle period coefficient.

Example 29 includes the computer-readable medium as defined in example 26, wherein the instructions, when executed, further cause the machine to in response to determining that the idle period is greater than a first threshold, assign the first threshold as the idle period, and in response to determining that the idle period is less than a second threshold, assign the second threshold as the idle period.

Example 30 is a system to reduce power consumption of a computing device including means for determining an idle period based on hardware residency of the computing device, and means for setting a timer to wake up a central processing unit (CPU) from a low power idle state after the idle period, the CPU to exit the low power idle state in response to executing an interrupt at the expiration of the idle period.

Example 31 includes the system as defined in example 30, further including means for monitoring power state residency counters for times in which the CPU resides in respective low power idle states.

Example 32 includes the system as defined in example 31, wherein the monitoring of the power state residency counters occurs in response to the CPU exiting the respective low power idle states.

Example 33 includes the system as defined in example 31 or example 32, wherein the means for determining of the idle period based on the hardware residency includes: means for determining an idle period coefficient, means for determining scale factors for respective low power idle states, and means for determining the idle period by multiplying the idle period coefficient by a sum of the times in which the CPU resides in the respective low power idle states multiplied by respective scale factors.

Example 34 includes the system as defined in example 33, wherein the means for determining of the idle period coefficient includes: means for initializing, when a power state increase of a device occurs, the idle period coefficient to a first value, and means for doubling the idle period coefficient.

Example 35 includes the system as defined in example 34, wherein the means for determining of the idle period based on the hardware residency includes: in response to determining that the idle period is greater than a first threshold, means for assigning the first threshold as the idle period, and in response to determining that the idle period is less than a second threshold, means for assigning the second threshold as the idle period.

Example 36 includes the system as defined in example 30, wherein the means for determining of the idle period based on hardware residency of the computing device increases idle time of the computing device and decreases power consumption of the computing device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to reduce power consumption of a computing device, the apparatus comprising:
    a hardware residency monitor to monitor power state residency counters for times in which a central processing unit (CPU) is in respective low power idle states;
    an idle time predictor to determine an idle period based on hardware residency of the computing device by:
        determining an idle period coefficient;
        determining scale factors for the respective low power idle states; and
        determining the idle period by multiplying the idle period coefficient by a sum of the times in which the central processing unit (CPU) is in the respective low power idle states multiplied by respective scale factors; and
    an interrupt controller to set a timer to wake up the CPU from a low power idle state after the idle period, the CPU to exit the low power idle state in response to executing an interrupt at the expiration of the idle period.

2. An apparatus as defined in claim 1, wherein the hardware residency monitor is to monitor the power state residency counters in response to the CPU exiting the respective low power idle states.

3. An apparatus as defined in claim 1, wherein to determine the idle period coefficient, the idle time predictor is to:
    when a power state increase of a device occurs, initialize the idle period coefficient to a first value; and
    double the idle period coefficient.

4. An apparatus as defined in claim 1, wherein to determine the idle period based on the hardware residency, the idle time predictor is to:
    in response to determining that the idle period satisfies a first threshold, assign the first threshold as the idle period; and
    in response to determining that the idle period does not satisfy a second threshold, assign the second threshold as the idle period.

5. An apparatus as defined in claim 1, wherein idle time of the computing device is increased and power consumption of the computing device is decreased in response to the idle time predictor determining the idle period based on the hardware residency of the computing device.

6. A method to reduce power consumption of a computing device, the method comprising:
    monitoring, by executing an instruction with a central processing unit (CPU), power state residency counters for times in which the CPU is in respective low power idle states;
    determining, by executing an instruction with the CPU, an idle period based on hardware residency of the computing device by:
        determining an idle period coefficient;
        determining scale factors for the respective low power idle states; and
        determining the idle period by multiplying the idle period coefficient by a sum of the times in which the CPU is in the respective low power idle states multiplied by respective scale factors; and
    setting, by executing an instruction with the CPU, a timer to wake up the CPU from a low power idle state after the idle period, the CPU to exit the low power idle state in response to executing an interrupt at the expiration of the idle period.

7. A method as defined in claim 6, wherein the monitoring of the power state residency counters occurs in response to the CPU exiting the respective low power idle states.

8. A method as defined in claim 6, wherein the determining of the idle period coefficient includes:
    when a power state increase of a device occurs, initializing the idle period coefficient to a first value; and
    doubling the idle period coefficient.

9. A method as defined in claim 6, wherein the determining of the idle period based on the hardware residency includes:
    in response to determining that the idle period satisfies a first threshold, assigning the first threshold as the idle period; and
    in response to determining that the idle period does not satisfy a second threshold, assigning the second threshold as the idle period.

10. A method as defined in claim 6, wherein the determining of the idle period based on the hardware residency of the computing device increases idle time of the computing device and decreases power consumption of the computing device.

11. At least one tangible computer-readable storage medium comprising instructions that, when executed, cause a computing device to at least:
    monitor power state residency counters for times in which a central processing unit (CPU) is in respective low power idle states;
    determine an idle period based on hardware residency of the computing device by:
        determining an idle period coefficient;
        determining scale factors for the respective low power idle states; and
        determining the idle period by multiplying the idle period coefficient by a sum of the times in which the CPU is in the respective low power idle states multiplied by respective scale factors; and
    set a timer to wake up the CPU from a low power idle state after the idle period, the CPU to exit the low power idle state in response to executing an interrupt at the expiration of the idle period.

12. At least one storage medium as defined in claim 11, further including instructions that, when executed, cause the computing device to monitor the power state residency counters in response to the CPU exiting the respective low power idle states.

13. At least one storage medium as defined in claim 11, further including instructions that, when executed, cause the computing device to:
   when a power state increase of a device occurs, initialize the idle period coefficient to a first value; and
   double the idle period coefficient.

14. At least one storage medium as defined in claim 13, further including instructions that, when executed, cause the computing device machine to:
   in response to determining that the idle period satisfies a first threshold, assign the first threshold as the idle period; and
   in response to determining that the idle period does not satisfy a second threshold, assign the second threshold as the idle period.

15. An apparatus as defined in claim 1, wherein the idle period coefficient is static over time.

16. An apparatus as defined in claim 1, wherein the idle period coefficient is larger when the CPU is in a first low power state than when the CPU is in a second low power state, the CPU to reside in the first low power state longer than in the second low power state.

* * * * *